(12) United States Patent
Nii

(10) Patent No.: US 9,534,115 B2
(45) Date of Patent: Jan. 3, 2017

(54) AROMATIC POLYCARBONATE COMPOSITE RESIN COMPOSITION AND MOLDED ARTICLE

(71) Applicant: MITSUBISHI ENGINEERING-PLASTICS CORPORATION, Minato-ku (JP)

(72) Inventor: Yuusuke Nii, Hiratsuka (JP)

(73) Assignee: Mitsubishi Engineering-Plastics Corporation, Minato-ku (JP)

( * ) Notice: Subject to any disclaimer, the term of this patent is extended or adjusted under 35 U.S.C. 154(b) by 304 days.

(21) Appl. No.: 14/387,690

(22) PCT Filed: Mar. 15, 2013

(86) PCT No.: PCT/JP2013/057377
§ 371 (c)(1),
(2) Date: Sep. 24, 2014

(87) PCT Pub. No.: WO2013/161433
PCT Pub. Date: Oct. 31, 2013

(65) Prior Publication Data
US 2015/0079324 A1 Mar. 19, 2015

(30) Foreign Application Priority Data

Apr. 23, 2012 (JP) ................................ 2012-097805

(51) Int. Cl.
| | | |
|---|---|---|
| *C08L 69/00* | (2006.01) | |
| *C08K 3/34* | (2006.01) | |
| *C08K 5/521* | (2006.01) | |
| *B29C 45/00* | (2006.01) | |

(52) U.S. Cl.
CPC ............ *C08L 69/00* (2013.01); *B29C 45/0001* (2013.01); *C08K 3/34* (2013.01); *C08K 5/521* (2013.01); *C08L 2201/02* (2013.01); *C08L 2205/03* (2013.01); *Y10T 428/1397* (2015.01)

(58) Field of Classification Search
CPC ... C08L 69/00; C08L 2201/02; C08L 2205/03; Y10T 428/1397; C08K 3/34; C08K 5/521; B29C 45/0001
See application file for complete search history.

(56) References Cited

FOREIGN PATENT DOCUMENTS

| | | |
|---|---|---|
| CN | 101346430 A | 1/2009 |
| JP | 2005-48067 | 2/2005 |
| JP | 2007-23118 | 2/2007 |
| JP | 2007-176970 | 7/2007 |
| JP | 2008-285529 | 11/2008 |
| JP | 2010-229305 | 10/2010 |
| JP | 2011-231280 A | 11/2011 |
| JP | 2012-77242 | 4/2012 |
| JP | 2012-219177 | 11/2012 |

OTHER PUBLICATIONS

Extended European Search Report issued Oct. 21, 2015 in Patent Application No. 13781920.7.
Combined Office Action and Search Report issued Apr. 3, 2015 in Chinese Patent Application No. 201380013644.8 (with English translation of category of cited documents).
International Search report issued Jun. 18, 2013 in PCT/JP2013/057377 filed Mar. 15, 2013.

*Primary Examiner* — Michael C Miggins
(74) *Attorney, Agent, or Firm* — Oblon, McClelland, Maier & Neustadt, L.L.P.

(57) ABSTRACT

A resin composition is provided which is excellent in impact resistance, heat resistance, moldability, and chemical resistance and which is suitable, for example, as a molding material for a portable terminal housing. An aromatic polycarbonate composite resin composition contains, with respect to 100 parts by mass of a resin component formed of 60 to 90 parts by mass of an aromatic polycarbonate resin (A) and 10 to 40 parts by mass of a polyester resin (B), 3 to 20 parts by mass of a graft copolymer (C) formed by graft polymerization of a (meth)acrylic acid ester compound with a diene-based rubber and 0.005 to 0.1 parts by mass of a stabilizer (D). The graft copolymer (C) has a sulfur content of 100 to 1,500 ppm and an average particle diameter of 70 to 240 nm, and the stabilizer (D) is an organic phosphate compound represented by the following general formula (I).

$$O{=}P(OH)_m(OR)_{3-m} \qquad (I)$$

R represents an alkyl group or an aryl group. m represents 0 to 2.

9 Claims, No Drawings

AROMATIC POLYCARBONATE COMPOSITE RESIN COMPOSITION AND MOLDED ARTICLE

FIELD OF INVENTION

The present invention relates to an aromatic polycarbonate composite resin composition, and more particularly to an aromatic polycarbonate composite resin composition which is excellent in impact resistance, heat resistance, moldability, and chemical resistance and which is suitable as a molding material for a portable terminal housing or the like. The present invention also relates to a molded article obtained by molding the aromatic polycarbonate composite resin composition described above.

BACKGROUND OF INVENTION

An aromatic polycarbonate resin is excellent in impact resistance, heat resistance, rigidity, dimensional stability, and the like. An aromatic polycarbonate resin therefore has been widely used in various applications, such as electric apparatuses, communication apparatuses, precision machines, automobile components, and the like.

Various studies have been made about compounding an aromatic polycarbonate resin with a polyester resin such as a poly(ethylene terephthalate) for improving chemical resistance of an aromatic polycarbonate resin. Patent Document 1 discloses a thermoplastic resin composition which has a high chemical resistance while maintaining a good fluidity and which is excellent in impact resistance, heat resistance, rigidity, and thermal stability. The thermoplastic resin composition includes an aromatic polycarbonate having a viscosity average molecular weight of 16,000 to 23,000, a poly(ethylene terephthalate) resin which has an intrinsic viscosity value (IV value) of 0.45 to 0.57 dl/g and a terminal carboxyl group amount of 20 to 35 eq/ton, and a rubber type polymer.

Patent Document 2 discloses an aromatic polycarbonate resin having fluidity, rigidity, heat resistance, impact resistance, chemical resistance, and fatigue resistance respectively in good balance. The aromatic polycarbonate resin composition includes an aromatic polycarbonate resin, a poly(butylene terephthalate) resin, and a rubber type polymer. The poly(butylene terephthalate) resin has a titanium compound content more than 1 to 75 ppm expressed as a content of a titanium atom, and has a terminal carboxyl group concentration of 39 µeq/g or less.

A housing of a portable terminal including a mobile phone, a smart phone, a portable game machine, and an electronic notebook has been required to reduce its size, thickness, weight, and cost, so that housings formed from thermoplastic resins have been widely used.

A thermoplastic resin composition used as a molding material for housing of a portable terminal requires having the following characteristics.
(1) Moldability having excellent fluidity and being capable of molding even a housing having a small wall thickness and a complicated shape with high accuracy. A short molding cycle is also required for improving productivity of a housing.
(2) Impact resistance by which no breakage occurs when a molded article is dropped by mistake in handling. The impact resistance is required to be excellent not only at an ordinary temperature but also in a low-temperature environment such as in winter or in a cold area.
(3) Chemical resistance by which no degradation occurs even if a cosmetic, a detergent, a chemical, and/or the like is adhered to a molded article.
(4) Durability against ambient environment in which a molded article is used. In particular, a high heat resistance under high temperature conditions in midsummer (such as an inside of an automobile parked under scorching sun) is required. The heat resistance is also required to satisfy the durability against baking in a coating operation. A sufficiently high heat resistance is also required even when a molding material is exposed to a long-term thermal history during molding. This heat resistance is referred to as the "residence heat resistance" in the present specification.

LIST OF DOCUMENTS

Patent Documents

Patent Document 1: Japanese Patent Publication 2007-23118 A
Patent Document 2: Japanese Patent Publication 2007-176970 A

OBJECT AND SUMMARY OF INVENTION

Although Patent Documents 1 and 2 disclose that the resin compositions described therein are effectively used in OA apparatus fields, electronic and electric apparatus fields or the like, the resin compositions do not satisfy all the characteristics required for a molding material used for portable terminal housings as described above. The resin compositions do not satisfy impact resistance especially particular a low-temperature impact resistance or heat resistance especially the residence heat resistance.

An object of the present invention is to provide an aromatic polycarbonate composite resin composition which is able to solve problems described above, which is excellent in impact resistance, heat resistance, moldability, and chemical resistance, which is excellent particularly in low-temperature impact resistance and residence heat resistance, and which can be suitably used as a molding material for portable terminal housings; and a molded article formed by molding the aromatic polycarbonate composite resin composition.

The inventor found through intensive researches that the above object can be achieved when a graft copolymer having a specific sulfur content and a specific average particle diameter and a specific stabilizer are compounded at a predetermined rate with a resin component formed of an aromatic polycarbonate resin and a polyester resin.

The present invention was made based on such finding, and the summary of the present invention is as below:

[1] An aromatic polycarbonate composite resin composition comprising;
   100 parts by mass of a resin component containing 60 to 90 parts by mass of an aromatic polycarbonate resin (A) and 10 to 40 parts by mass of a polyester resin (B);
   3 to 20 parts by mass of a graft copolymer (C) formed by graft polymerization of a (meth)acrylic acid ester compound with a diene-based rubber; and
   0.005 to 0.1 parts by mass of a stabilizer (D), wherein the graft copolymer (C) has
(i) a sulfur content of 100 to 1,500 ppm, and
(ii) an average particle diameter of 70 to 240 nm, and
wherein the stabilizer (D) is an organic phosphate compound represented by the following general formula (I):

$$O=P(OH)_m(OR)_{3-m} \qquad (I)$$

In the general formula (I), R represents an alkyl group or an aryl group and Rs may be the same or different from each other. m represents an integer of 0 to 2.

[2] The aromatic polycarbonate composite resin composition according to [1], wherein the resin composition further contains 0.01 to 0.5 parts by mass of a silicate salt compound (E) with respect to 100 parts by mass of the resin component.

[3] The aromatic polycarbonate composite resin composition according to [2], wherein the silicate salt compound (E) is talc.

[4] The aromatic polycarbonate composite resin composition according to any one of [1] to [3], wherein the diene-based rubber is a butadiene-based rubber containing 80 percent by mass or more of butadiene.

[5] The aromatic polycarbonate composite resin composition according to any one of [1] to [4], wherein the graft copolymer (C) is a core/shell type graft copolymer in which the diene-based rubber functions as a core and the (meth)acrylic acid ester compound functions as a shell.

[6] The aromatic polycarbonate composite resin composition according to any one of [1] to [5], wherein the resin composition has a melt volume rate of 10 to 40 cm³/10 minutes, the melt volume rate being measured in accordance with ISO1133 at a measurement temperature of 300° C. and at a measurement load of 1.2 kgf (11.8 N) after the resin composition in the form of pellets is dried at 120° C. for 4 hours or more.

[7] A molded article obtained by molding the aromatic polycarbonate composite resin composition according to any one of [1] to [6].

[8] The molded article according to [7], wherein the article is a housing a portable terminal.

Advantageous Effects of Invention

The aromatic polycarbonate composite resin composition of the present invention is excellent in impact resistance, heat resistance, moldability, and chemical resistance. The resin composition is excellent particularly in low-temperature impact resistance and residence heat resistance. The resin composition is suitably used as a molding material for portable terminal housings or the like.

Since being excellent in impact resistance, heat resistance, moldability, and chemical resistance as described above, the aromatic polycarbonate composite resin composition of the present invention may be applied not only to the portable terminal housings but also to various other applications, such as various types of electric and electronic apparatus components, OA apparatuses, machine components, vehicle components, building components, various types of containers, leisure goods, and miscellaneous goods.

DESCRIPTION OF EMBODIMENTS

Hereinafter, the present invention will be described in detail with reference to the following embodiments, examples, and the like. The present invention is not limited thereto and may be arbitrarily changed and modified without departing from the scope of the present invention.

[Resume]

The aromatic polycarbonate composite resin composition of the present invention comprises 100 parts by mass of a resin component containing 60 to 90 parts by mass of an aromatic polycarbonate resin (A) and 10 to 40 parts by mass of a polyester resin (B); 3 to 20 parts by mass of a graft copolymer (C) formed by graft polymerization of a (meth) acrylic acid ester compound with a diene rubber; and 0.005 to 0.1 parts by mass of a stabilizer (D). The graft copolymer (C) has (i) a sulfur content of 100 to 1,500 ppm; and (ii) an average particle diameter of 70 to 240 nm. The stabilizer (D) is an organic phosphate compound represented by the following general formula (I), and if necessary, a silicate salt compound (E) and another component may also be contained.

$$O=P(OH)_m(OR)_{3-m} \qquad (I)$$

In the general formula (I), R represents an alkyl group or an aryl group, and Rs may be the same or different from each other. m represents an integer of 0 to 2.

A molded article of the present invention is formed by molding the aromatic polycarbonate composite resin composition of the present invention. The article is suitably used for portable terminal housings.

[Aromatic Polycarbonate Resin (A)]

The aromatic polycarbonate resin (A) is an aromatic polycarbonate polymer, which may be a branched polymer, obtained by a reaction between an aromatic dihydroxy compound and phosgene or a diester carbonate. The aromatic polycarbonate resin may be manufactured by various methods including a phosgene method (interfacial polymerization method) or a melting method (ester exchange method), but not limitative thereto. The aromatic polycarbonate resin (A) may be an aromatic polycarbonate resin which is manufactured by a melting method where a terminal OH group amount is adjusted.

A representative aromatic dihydroxy compound which is one of raw materials of the aromatic polycarbonate resin (A) used in the present invention includes mentioned bis(4-hydroxyphenyl)methane, 2,2-bis(4-hydroxyphenyl)propane, 2,2-bis(4-hydroxy-3-methylphenyl)propane, 2,2-bis(4-hydroxy-3-t- butylphenyl)propane, 2,2-bis(4-hydroxy-3,5-dimethylphenyl)propane, 2,2-bis(4-hydroxy-3,5-dibromophenyl)propane, 4,4-bis(4-hydroxyphenyl)heptane, 1,1-bis(4-hydroxyphenyl)cyclohexane, 4,4'-dihydroxybiphenyl, 3,3',5,5'-tetramethyl-4,4'-dihydroxybiphenyl, bis(4-hydroxyphenyl)sulfone, bis(4-hydroxyphenyl)sulfide, bis(4-hydroxyphenyl)ether, and bis(4-hydroxyphenyl)ketone.

A small amount of a branching agent may be used with the compound mentioned above. The agent may be a polyphenol having at least three hydroxy groups in its molecule, such as 1,1,1-tris(4-hydroxyphenyl)ethane (THPE) or 1,3,5-tris(4-hydroxyphenyl)benzene.

Among the aromatic dihydroxy compounds, 2,2-bis(4-hydroxyphenyl)propane (bisphenol A) is preferable. The aromatic dihydroxy compound may be used alone, or at least two types thereof may be used by mixing.

A branched aromatic polycarbonate resin can be obtained by using, as a part of the above aromatic dihydroxy compound, a polyhydroxy compound, such as phloroglucin, 4,6-dimethyl-2,4,6-tris(4-hydroxyphenyl)heptene-2,4,6-dimethyl-2,4,6-tris(4-hydroxyphenyl)heptane, 2,6-dimethyl-2,4,6-tris(4-hydroxyphenyl)heptene-3,1,3,5-tris(4-hydroxyphenyl)benzene, or 1,1,1-tris(4-hydroxyphenyl)ethane, 3,3-bis(4-hydroxyaryl)oxindole (isatin bisphenol), 5-chloroisatin, 5,7-dichloroisatin, or 5-bromoisatin, and an amount thereof is 0.01 to 10 percent by mole and preferably 0.1 to 2 percent by mole with respect to the aromatic hydroxy compound.

In polymerization by an ester exchange method, a diester carbonate is used as a monomer instead of phosgene. A representative example of the diester carbonate includes diphenyl carbonate; a substituted diaryl carbonate, ditolyl carbonate; or a dialkyl carbonate, such as dimethyl carbonate, diethyl carbonate, or di-tert-butyl carbonate. Those diester carbonates may be used alone, or at least two types thereof may be used by mixing. Among those mentioned above, diphenyl carbonate or a substituted diphenyl carbonate is preferable.

The above diester carbonate in an amount of preferably 50 percent by mole or less and more preferably 30 percent by mole or less may be substituted by a dicarboxylic acid or a dicarboxylic acid ester. A representative dicarboxylic acid or dicarboxylic acid ester includes terephthalic acid, isophthalic acid, diphenyl terephthalate, or diphenyl isophthalate. A polyester carbonate may be obtained, when substitution is performed by the dicarboxylic acid or the dicarboxylic acid ester includes described above.

A catalyst may be used when the aromatic polycarbonate is manufactured by an ester exchange method. The catalyst may be a basic compound such as an alkali metal compound, an alkaline earth metal compound, a basic boron compound, a basic phosphorous compound, a basic ammonium compound, or an amine-based compound. Among those, an alkali metal compound and/or an alkaline earth metal compound is particularly preferable. Those compounds mentioned above may be used alone, or at least two types thereof may be used in combination. In an ester exchange method, the polymerization catalyst is generally deactivated by p-toluene sulfonic acid ester or the like.

A resin preferably used as the aromatic polycarbonate resin (A) may be an aromatic polycarbonate resin derived from 2,2-bis(4-hydroxyphenyl)propane or an aromatic polycarbonate resin derived from 2,2-bis(4-hydroxyphenyl)propane and another aromatic dihydroxy compound. A polymer or an oligomer having a siloxane structure may be copolymerized in order to impart flame retardancy and the like. The aromatic polycarbonate resin (A) may be a mixture of at least two types of polymers and/or copolymers formed from different raw materials, and a branched structure may be contained in a range of 0.5 percent by mole or less.

The content of a terminal hydroxy group of the aromatic polycarbonate resin (A) has a significant influence on the thermal stability, hydrolytic stability, hue, and the like of a molded article. In order to obtain practical properties, the content of the terminal hydroxyl group of the aromatic polycarbonate resin (A) is generally 30 to 2,000 ppm, preferably 100 to 1,500 ppm, and more preferably 200 to 1,000 ppm. A terminal sealing agent for adjusting the content of the terminal hydroxy group may be p-tert-butylphenol, phenol, cumylphenol, or a p-long chain alkyl substituted phenol.

As for the amount of a remaining monomer in the aromatic polycarbonate resin (A), the amount of the aromatic dihydroxy compound is 150 ppm or less, preferably 100 ppm or less, and more preferably 50 ppm or less. When the synthesis is performed by an ester exchange method, the amount of a remaining diester carbonate is 300 ppm or less, preferably 200 ppm or less, and more preferably 150 ppm or less.

A viscosity average molecular weight of the aromatic polycarbonate resin (A) calculated from a solution viscosity measured at a temperature of 20° C. using methyl chloride as a solvent is not limitative but is preferably 10,000 to 50,000, more preferably 11,000 to 40,000, and particularly preferably 12,000 to 30,000. When the viscosity average molecular weight is 10,000 or more, more effective mechanical characteristics can be obtained. When the viscosity average molecular weight is 50,000 or less, mold processing can be more easily performed.

The aromatic polycarbonate resin (A) may be used by mixing at least two types of aromatic polycarbonate resins having different viscosity average molecular weights. Aromatic polycarbonate resins having viscosity average molecular weights out of the above preferable ranges may also be used by mixing so as to have a viscosity average molecular weight within the above molecular weight range.

[Polyester Resin (B)]

The polyester resin (B) may be any known arbitrary polyester resins, but is preferably an aromatic polyester resin. In this embodiment, the aromatic polyester resin indicates a polyester resin having an aromatic ring in a chain unit of the polymer. The aromatic polyester resin may be a polymer or a copolymer which is obtained by polycondensation using an aromatic dicarboxylic acid component and a diol (and/or an ester or a halogenated compound thereof) component as primary components.

The aromatic dicarboxylic acid component may be phthalic acid, terephthalic acid, isophthalic acid, orthophthalic acid, 1,5-naphthalene dicarboxylic acid, 2,5-naphthalene dicarboxylic acid, 2,6-naphthalene dicarboxylic acid, biphenyl-2,2'-dicarboxylic acid, biphenyl-3,3'-dicarboxylic acid, biphenyl-4,4'-dicarboxylic acid, diphenyl eter-4,4'-dicarboxylic acid, diphenyl methane-4,4'-dicarboxylic acid, diphenyl sulfone-4,4'-dicarboxylic acid, diphenyl isopropylidene-4,4'-dicarboxylic acid, anthrathene-2,5-dicarboxylic acid, anthrathene-2,6-dicarboxylic acid, p-terphenylene-4,4'-dicarboxylic acid, pyridine-2,5-dicarboxylic acid, succinic acid, adipic acid, sebacic acid, suberic acid, azelaic acid, and a dimer acid.

Those aromatic dicarboxylic acid components may be used alone, or at least two types thereof may be used in combination at an arbitrary rate. Among those aromatic dicarboxylic acids, terephthalic acid is preferable. Alicyclic dicarboxylic acid, such as adipic acid, pimelic acid, suberic acid, azelaic acid, dodecanedioic acid, sebacic acid, or a dimer acid may also be used with those aromatic dicarboxylic acids mentioned above, as long as the effect of the present invention is not impaired.

The diol component may be aliphatic glycol, polyoxyalkylene glycol, alicyclic diol, and aromatic diol.

The aliphatic glycol may be glycol having 2 to 20 carbon atoms, such as ethylene glycol, trimethylene glycol, propylene glycol, 1,4-butanediol, 1,3-butanediol, neopentyl glycol, hexane diol, octane diol, or decane diol may be mentioned. Among those mentioned above, aliphatic glycol having 2 to 12 carbon atoms, in particular 2 to 10 carbon atoms, is preferable.

The polyoxyalkylene glycol may be glycol including a plurality of oxyalkylene units and having the number of carbon atoms of the alkylene group of 2 to 4. The polyoxyalkylene glycol may be diethylene glycol, dipropylene glycol, ditetramethylene glycol, triethylene glycol, tripropylene glycol, or tritetramethylene glycol.

The alicyclic diol may be 1,4-cyclohexane diol, 1,4-cyclohexane dimethylol, or hydrogenated bisphenol A.

The aromatic diol may be 2,2-bis-(4-2-hydroxyethoxy) phenyl)propane or xylylene glycol.

As the other diols, esters of the diols mentioned above and halogenated compounds, such as halogenated diols including tetrabromo bisphenol A, an alkylene oxide (ethylene oxide or propylene oxide) adduct of tetrabromo bisphenol A, or the like may be used.

Those diol components may be used alone, or at least two types thereof may be used in combination. A long chain diol having a molecular weight of 400 to 6,000, such as a polyethylene glycol, a poly-1,3-propylene glycol, or a polytetramethylene glycol, may also be used as long as the amount thereof is small.

As the aromatic polyester resin used in the present invention, a poly(alkylene terephthalate) is preferable. In this case, the poly(alkylene terephthalate) represents a resin containing alkylene terephthalate structural units and may be a copolymer containing alkylene terephthalate structural units and structural units different therefrom.

The poly(alkylene terephthalate) may be poly(butylene terephthalate) (PBT), poly(ethylene terephthalate) (PET), poly(propylene terephthalate), poly(ethylene naphthalate) (PEN), poly(butylene naphthalate) (PBN), poly(cyclohexane-1,4-dimethylelen terephthalate), and poly(trimethylene terephthalate).

Other poly(alkylene terephthalate) which may be used in the present invention includes an alkylene terephthalate copolymer containing an alkylene terephthalate structural unit as a primary structural unit and a poly(alkylene terephthalate) mixture containing poly(alkylene terephthalate) as a primary component. Furthermore, a mixture containing an elastomer component, such as a poly(oxytetramethylene glycol) (PTMG), or a copolymer copolymerized therewith may also be used.

An alkylene terephthalate copolyester may be a copolyester formed from at least two types of diol components and terephthalic acid or a copolyester formed from a diol component, terephthalic acid, and a dicarboxylic acid other than terephthalic acid. When at least two types of diol components are used, the diol components may be appropriately selected from the diol components mentioned above. Heat resistance of the copolyester is improved preferably when the amount of a monomer unit to be copolymerized with the alkylene terephthalate which is a primary structural unit is 25 percent by mass or less.

The alkylene terephthalate copolyester may be an ethylene glycol/isophthalic acid/terephthalic acid copolymer (isophthalic acid copolymerized poly(ethylene terephthalate)) or a 1,4-butanediol/isophthalic acid/terephthalic acid copolymer (isophthalic acid copolymerized poly(butylene terephthalate)), which has an alkylene terephthalate structural unit as a primary structural unit. The aromatic polyester resin may also be 1,4-butanediol/isophthalic acid/decane dicarboxylic acid copolymer. Among those mentioned above, the alkylene terephthalate copolyester is preferable.

When the copolyester of an alkylene terephthalate is used, the polyester resin (B) is preferably the isophthalic acid copolymerized poly(butylene terephthalate) and the isophthalic acid copolymerized poly(ethylene terephthalate) mentioned above. Among those mentioned above, a polyester resin containing 25 percent by mass or less of an isophthalic acid component is preferable due to its high heat resistance.

<Poly(Butylene Terephthalate)>

The polyester resin (B) is preferably poly(butylene terephthalate). The poly(butylene terephthalate) indicates a resin having a structure in which terephthalic acid units and 1,4-butanediol units are ester-bonded to each other. In the present invention, a poly(butylene terephthalate) is preferably used in which 50 percent by mole or more of the dicarboxylic acid units are terephthalic acid units, and 50 percent by mole or more of the diol components are 1,4-butanediol units. The rate of the terephthalic acid units in the total dicarboxylic acid units is preferably 70 percent by mole or more, more preferably 80 percent by mole or more, particularly preferably 95 percent by mole or more, and most preferably 98 percent by mole or more. The rate of the 1,4-butanediol units in the total diol units is preferably 70 percent by mole or more, more preferably 80 percent by mole or more, particularly preferably 95 percent by mole or more, and most preferably 98 percent by mole or more. When the rate of the terephthalic acid units or the 1,4-butanediol units is not less than the lower limit, the moldability is improved since the crystallization speed is put in an appropriate range.

As described above, the poly(butylene terephthalate) may contain a dicarboxylic acid unit other than terephthalic acid. The dicarboxylic acid other than terephthalic acid is not particularly limited, but may be aromatic dicarboxylic acid, such as phthalic acid, isophthalic acid, 4,4'-diphenyl dicarboxylic acid, 4,4'-diphenyl ether dicarboxylic acid, 4,4'-benzophenone dicarboxylic acid, 4,4'-diphenoxyethane dicarboxylic acid, 4,4'-diphenyl sulfone dicarboxylic acid, or 2,6-naphthalene dicarboxylic acid; alicyclic dicarboxylic acid, such as 1,2-cyclohexane dicarboxylic acid, 1,3-cyclohexane dicarboxylic acid, or 1,4-cycyclohexane dicarboxylic acid; or aliphatic dicarboxylic acid, such as malonic acid, succinic acid, glutaric acid, adipic acid, pimelic acid, suberic acid, azelaic acid, or sebacic acid. Those dicarboxylic acid units may be introduced into a polymer skeleton when a dicarboxylic acid or a dicarboxylic acid derivative such as a dicarboxylic acid ester or a dicarboxylic acid halide is used as a raw material.

As described above, the poly(butylene terephthalate) may contain a diol unit other than 1,4-butanediol. The diol other than 1,4-butanediol is not particularly limited, but may be aliphatic diol such as ethylene glycol, diethylene glycol, polyethylene glycol, 1,2-propanediol, 1,3-propanediol, polypropylene glycol, polytetramethylene glycol, dibutylene glycol, 1,5-pentandiol, neopentyl glycol, 1,6-hexane diol, or 1,8-octane diol; alicyclic diol, such as 1,2-cyclohexanediol, 1,4-cyclohexanediol, 1,1-cyclohexanedimethylol, or 1,4-cyclohexanedimethylol; or aromatic diol, such as xylylene glycol, 4,4'-dihydroxy biphenyl, 2,2-bis(4-hydroxyphenyl)propane, or bis(4-hydroxyphenyl)sulfone.

The poly(butylene terephthalate) may also contain a unit derived from hydroxy carboxylic acid such as lactic acid, glycolic acid, m-hydroxybenzoic acid, p-hydroxybenzoic acid, 6-hydroxy-2-naphthalene carboxylic acid, or p-(β-hydroxyethoxy)benzoic acid; a monofunctional compound such as an alkoxy carboxylic acid, stearyl alcohol, benzyl alcohol, stearic acid, benzoic acid, t-butylbenzoic acid, or benzoyl benzoic acid; or a compound having at least three functional groups such as tricarballylic acid, trimellitic acid, trimesic acid, pyromellitic acid, gallic acid, trimethylolethane, trimethylolpropane, glycerol, or pentaerythritol.

Although the intrinsic viscosity of the poly(butylene terephthalate) used in the present invention is not particularly limited, the lower limit thereof may be determined in view of mechanical characteristics, and the upper limit may be determined in view of molding processability. The intrinsic viscosity of the poly(butylene terephthalate) is preferably 0.70 to 3.0 dl/g, more preferably 0.80 to 1.5 dl/g, and particularly preferably 0.80 to 1.2 dl/g. When the intrinsic viscosity is in the range described above, preferable molding processability can also be obtained besides good mechanical characteristics. The value of the intrinsic viscosity described above is measured at a temperature of 30° C. using a mixed solvent in which 1,1,2,2-tetrachloroethane/phenol is 1/1 (weight ratio).

In the present invention, at least two types of poly (butylene terephthalate)'s having different intrinsic viscosities may be used in combination.

A terminal carboxyl group concentration of the poly (butylene terephthalate) used in the present invention is preferably 120 eq/Ton or less, more preferably 2 to 80 eq/Ton, and particularly preferably 5 to 60 eq/Ton. When the terminal carboxyl group concentration is 120 eq/Ton or less, the hydrolysis resistance and the fluidity are improved, and the terminal carboxyl group concentration is preferably 2 eq/Ton or more in view of productivity. The terminal carboxyl group concentration is obtained in such a way that after a poly(butylene terephthalate) is dissolved in benzyl alcohol, this solution is titrated with an aqueous solution containing 0.1 N (mol/l) of sodium hydroxide, and the value thus obtained is the carboxyl group equivalent per $10^6$ g.

<Poly(Ethylene Terephthalate)>

The polyester resin (B) may include poly(ethylene terephthalate). In this case, the poly(ethylene terephthalate) is a poly(ethylene terephthalate) resin in which the rate (hereinafter referred to as "ET rate" in some cases) of oxyethylene oxyterephthaloyl units (hereinafter referred to as "ET unit" in some cases) to the total structural repeating units is preferably 90 percent by equivalent or more. The poly(ethylene terephthalate) of the present invention may contain less than 10 percent by equivalent of structural repeating units other then the ET units. Although the poly (ethylene terephthalate) of the present invention is manufactured by using terephthalic acid or a lower alkyl ester thereof and ethylene glycol as primary raw materials, another acid component and/or another glycol component may also be used as a raw material together therewith.

An acid component other than terephthalic acid may be phthalic acid, isophthalic acid, naphthalene dicarboxylic acid, 4,4'-diphenyl sulfone dicarboxylic acid, 4,4'-biphenyl dicarboxylic acid, 1,4-cyclohexane dicarboxylic acid, (1,3-phenylene dioxy)diacetic acid, and structural isomers thereof; dicarboxylic acid such as malonic acid, succinic acid, adipic acid, and derivatives thereof; and oxy acid such as p-hydroxy benzoic acid, glycolic acid, or a derivative thereof.

A diol component other than ethylene glycol may be aliphatic glycol such as 1,2-propanediol, 1,3-propanediol, 1,4-butanediol, pentamethylene glycol, hexamethylene glycol, or neopentyl glycol; alicyclic glycol such as cyclohexane dimethanol; or an aromatic dihydroxy compound derivative such as bisphenol A or bisphenol S.

The raw materials as described above including terephthalic acid or an ester-forming derivative thereof and ethylene glycol react to form bis(β-hydroxyethyl) terephthalate and/or an oligomer thereof by an esterification reaction or an ester exchange reaction in the presence of an esterification catalyst or an ester exchange catalyst, and melt polycondensation is then performed under high-temperature and reduced-pressure conditions in the presence of a polycondensation catalyst and a stabilizer, thereby forming a polymer.

Since terephthalic acid functions as a self catalyst for an esterification reaction, the esterification catalyst is not particularly required. In addition, the esterification reaction may be performed under the condition in which the esterification catalyst coexists with a polycondensation catalyst, which will be described later, or may also be performed in the presence of a small amount of an inorganic acid or the like.

The esterification catalyst is preferably an alkali metal salt of sodium, lithium, or the like, an alkaline earth metal salt of magnesium, calcium, or the like, or a metal compound of zinc, manganese, or the like. The esterification catalyst is more preferably a manganese compound in view of the appearance of the poly(ethylene terephthalate).

The polycondensation catalyst may be one or more compounds such as a germanium compound, an antimony compound, a titanium compound, a cobalt compound, and a tin compound, which are soluble in a reaction system. The polycondensation catalyst is preferably germanium dioxide in view of hue, transparency, and the like. The polycondensation catalysts mentioned above may be used together with a stabilizer in order to suppress a decomposition reaction during polymerization. The stabilizer is preferably at least one of phosphate esters such as trimethyl phosphate, triethyl phosphate, and triphenyl phosphate; phosphite esters such as triphenyl phosphite and trisdecyl phosphite; acid phosphate such as methyl acid phosphate, dibutyl phosphate, and monobutyl phosphate; and phosphorus compounds such as phosphoric acid, phosphorous acid, hypophosphorous acid, and polyphosphoric.

An amount of the above catalyst in the total polymer raw materials is usually 1 to 2,000 ppm and preferably 3 to 500 ppm in terms of the weight of the metal in the catalyst. An amount of the stabilizer in the total polymer raw materials is usually 10 to 1,000 ppm and preferably 20 to 200 ppm in terms of the weight of the phosphorus atom in the stabilizer. The supply of the catalyst and the stabilizer may be performed at an arbitrary stage in the esterification reaction or the ester exchange reaction besides at a stage of preparing a raw material slurry. Furthermore, the supply may also be performed at an initial stage of a polycondensation reaction process.

A reaction temperature of the esterification reaction or the ester exchange reaction is usually 240° C. to 280° C. A reaction pressure thereof is usually 0.2 to 3 kg/cm²G (20 to 300 kPa) as a relative pressure with respect to the atmosphere. A reaction temperature of the polycondensation is usually 250° C. to 300° C. A reaction pressure thereof is usually 500 to 0.1 mmHg (67 to 0.013 kPa) as an absolute pressure. The esterification reaction or the ester exchange reaction and the polycondensation reaction as described above may be performed by one step or through a plurality of steps. The poly(ethylene terephthalate) thus obtained usually has a limiting viscosity of 0.45 to 0.70 dl/g and is formed into chips by a common method. The average particle diameter of the chips thus formed is usually 2.0 to 5.5 mm and preferably 2.2 to 4.0 mm.

The polymer obtained by the melt polycondensation as described above is then subjected to solid phase polymerization usually. The polymer chips to be subjected to the solid phase polymerization may be first pre-crystallized by heating at a temperature lower than that for the solid phase polymerization and then processed thereby. The pre-crystallization as described above may be performed by a method (a) in which polymer chips in a dried state are heated for 1 minute to 4 hours at a temperature of usually 120° C. to 200° C. and preferably 130° C. to 180° C., a method (b) in which polymer chips in a dried state are heated for 1 minute or more at a temperature of usually 120° C. to 200° C. in a steam atmosphere or an inert gas atmosphere containing steam, or a method (c) in which polymer chips are allowed to absorb moisture in a steam atmosphere or an inert gas atmosphere containing steam for moisture control and are then heated for 1 minute or more at a temperature of usually 120° C. to 200° C. This moisture control of the polymer chips is performed so that the moisture content is usually 100 to 10,000 ppm and preferably 1,000 to 5,000 ppm. When the polymer chips processed by the moisture control are subjected to the solid phase polymerization, the amount of acetaldehyde contained in the PET can be reduced. An amount of impurities contained therein at a very small amount also can be further reduced.

The solid phase polymerization is performed by at least one step in an atmosphere in which an inert gas such as nitrogen, argon, or carbon dioxide flows under the conditions in which the polymerization temperature is usually 190° C. to 230° C. and preferably 195° C. to 225° C., and the polymerization pressure is usually 1 kg/cm$^2$G to 10 mm Hg (200 to 1.3 kPa in absolute pressure) and preferably 0.5 kg/cm$^2$G to 100 mm Hg (150 to 13 kPa in absolute pressure). The time for the solid phase polymerization may be decreased as the temperature is increased. The time is usually 1 to 50 hours, preferably 5 to 30 hours, and more preferably 10 to 25 hours. The limiting viscosity of the polymer obtained by the solid phase polymerization is usually in a range of 0.70 to 0.90 dl/g.

The intrinsic viscosity of the poly(ethylene terephthalate) used in the present invention may be appropriately selected and determined. The intrinsic viscosity is usually 0.5 to 2 dl/g, preferably 0.6 to 1.5 dl/g, and particularly preferably 0.7 to 1.0 dl/g. When the intrinsic viscosity is 0.5 dl/g or more and particularly 0.7 dl/g or more, the mechanical characteristics, residence heat resistance, chemical resistance, and moisture heat resistance of the resin composition (A) of the present invention tend to be improved. When the intrinsic viscosity is 2 dl/g or less and particularly 1.0 dl/g or less, the fluidity of the resin composition tends to be improved, which is preferable.

In the present invention, the intrinsic viscosity of the poly(ethylene terephthalate) is a value measured at a temperature of 30° C. using a mixed solvent containing phenol and tetrachloroethane (at a weight ratio of 1/1).

The terminal carboxyl group concentration of the poly (ethylene terephthalate) used in the present invention is usually 1 to 60 eq/Ton, preferably 3 to 50 eq/Ton, and more preferably 5 to 40 eq/Ton. When the terminal carboxyl group concentration is 60 eq/Ton or less, the mechanical characteristics of the resin composition preferably tend to be improved. When the terminal carboxyl group concentration is 1 eq/Ton or more, the heat resistance, residence heat resistance, and hue of the resin composition preferably are improved.

The terminal carboxyl group concentration of the poly (ethylene terephthalate) may be obtained in such a way that after 0.5 g of the poly(ethylene terephthalate) resin is dissolved in 25 ml of benzyl alcohol, this solution is titrated using a benzyl alcohol solution containing sodium hydroxide at a concentration of 0.01 mole/L.

The poly(ethylene terephthalate) used in the present invention is preferably a poly(ethylene terephthalate) on which a deactivation treatment of the polycondensation catalyst is performed as described above.

That is, since a resin composition obtained by compounding the polyester resin (B) with the aromatic polycarbonate resin (A) has poor thermal stability, various problems may arise when the resin composition is held at a high temperature in a cylinder in a molding step. For example, since an ester exchange reaction occurs between the aromatic polycarbonate resin (A) and the polyester resin (B), appearance defects of a molded article, such as so-called bubbles and silver streaks, caused by generation of decomposition gases by the reaction may occur; since the molecular weight of the aromatic polycarbonate resin (A) is decreased, the inherent impact resistance, heat-distortion resistance, and the like of the aromatic polycarbonate resin (A) are degraded; and furthermore, since the viscosity of the aromatic polycarbonate composite resin composition is changed by the residence thereof at a high temperature, the molding stability in injection molding is degraded, and as a result, a short shot of a molded article and generation of flash occur.

Since the problem of this residence-induced thermal degradation is caused by a polycondensation catalyst used in a step of manufacturing the poly(ethylene terephthalate) and contained in the poly(ethylene terephthalate) provided as a final product, the residence-induced thermal degradation can be suppressed when a poly(ethylene terephthalate) containing a deactivated polycondensation catalyst is used as the poly(ethylene terephthalate).

A treatment method for deactivating the polycondensation catalyst in the poly(ethylene terephthalate) is not particularly limited, and a related known deactivation treatment may be performed in accordance with a polycondensation catalyst to be used. The deactivation treatment method includes the following methods;

A treatment method 1 for deactivating the polycondensation catalyst comprising a step of treating germanium catalyst by hot water (steam):

In this method, poly(ethylene terephthalate) is processed by a hot water (steam) treatment to deactivate a germanium catalyst in the poly(ethylene terephthalate).

In detail, after poly(ethylene terephthalate) is filled in a container, steam at a temperature of 70° C. to 150° C. such as approximately 100° C. is allowed to pass through the poly(ethylene terephthalate) at a flow rate of 1 to 100 percent by mass per one hour for 5 to 6,000 minutes for a steam treatment, followed by drying.

The poly(ethylene terephthalate) is immersed in distilled water in a container. The weight of the distilled water is 0.3 to 10 times the weight of the poly(ethylene terephthalate). The container in which the poly(ethylene terephthalate) and the distilled water are contained is heated from the outside so that the inside temperature is controlled in a range of 70° C. to 110° C., and container is held at this state for 3 to 3,000 minutes thereby performing a hot water treatment. Subsequently, dehydration and drying are sequentially performed.

The above drying is generally performed in an inert gas such as nitrogen at 120° C. to 180° C. for 3 to 8 hours.

A treatment method 2 for deactivating the polycondensation catalyst comprising a step of adding phosphorus compound to titanium catalyst:

In this method, a phosphorus compound is added to a poly(ethylene terephthalate) to deactivate a titanium catalyst in the poly(ethylene terephthalate). An addition amount of the phosphorus compound is preferably in a range of 7 to 145 ppm based on the weight of the poly(ethylene terephthalate). An addition amount of the phosphorus compound is 7 ppm or more in the form of a phosphorus atom, the catalyst is sufficiently deactivated, and a targeted effect can be obtained. When the addition amount of the phosphorus compound is 145 ppm or less in the form of a phosphorus atom, coarse and agglomerated particles are prevented to be formed from the phosphorus compound itself, whereby problems including appearance defects and degradation in impact resistance are prevented.

The phosphorus compound may be related known phosphate ester compounds, phosphite ester compounds, and phosphonate compounds. Among those, a phosphonate compound represented by the following general formula (II) is preferable.

$$R^1OC(O)XP(O)(OR^2)_2 \quad (II)$$

In the general formula (II), $R^1$ and $R^2$ each represent an alkyl group having 1 to 4 carbon atoms, X represents —$CH_2$— or —CH(Y)— (Y represents a phenyl group), and $R^1$ and $R^2$ may be the same or different from each other.

Among the phosphonate compounds represented by the above general formula (II), alkyl phosphonate compounds are preferable, and triethyl phosphonoacetate is more preferable. Those compounds may be used alone, or at least two types thereof may be used in combination.

The above deactivation treatment methods of the polycondensation catalyst in the poly(ethylene terephthalate) are examples of a deactivation treatment which can be used in the present invention, and the deactivation treatment of the present invention is not limited at all to the methods described above.

Hereinafter, poly(ethylene terephthalate) processed by a deactivation treatment of the polycondensation catalyst is referred to "deactivated PET", and untreated poly(ethylene terephthalate) is referred to "untreated PET".

The deactivated PET used in the present invention in which the polycondensation catalyst is processed by the deactivation treatment as described above preferably has a solid phase polymerization rate Ks of 0.006 (dl/g·hr) or less, more preferably 0.005 (dl/g·hr) or less, and particularly preferably approximately 0.001 to 0.004 (dl/g·hr). The solid phase polymerization rate Ks is calculated by the following formula (1):

$$\text{Solid phase polymerization rate } Ks=([\eta]s-[\eta]m)/T \quad (1)$$

In the above formula, $[\eta]s$ represents an intrinsic viscosity (dl/g) of the poly(ethylene terephthalate) obtained after the poly(ethylene terephthalate) is held in a nitrogen flow at 210° C. for 3 hours, and $[\eta]m$ represents an intrinsic viscosity (dl/g) of the poly(ethylene terephthalate) obtained after the poly(ethylene terephthalate) is held in a nitrogen flow at 210° C. for 2 hours. T indicates 1 (hour). That is, the intrinsic viscosity obtained after the PET is held in a nitrogen flow at 210° C. for 3 hours is represented by $[\eta]s$, the intrinsic viscosity obtained after the PET is held for 2 hours under the same conditions as described above is represented by $[\eta]m$. The solid phase polymerization rate Ks is calculated by the above formula (I) using those two values. T indicates 1 hour.

When the solid phase polymerization rate Ks of the deactivated PET is 0.006 (dl/g·hr) or less, the deactivation treatment of the polycondensation catalyst is sufficient, and an effect of suppressing the residence-induced thermal degradation can be sufficiently obtained. It is difficult to excessively decrease the solid phase polymerization rate Ks, and the solid phase polymerization rate Ks is usually 0.001 (dl/g·hr) or more.

[Resin Component]

The resin component of the aromatic polycarbonate composite resin composition of the present invention is formed of at least one type of aromatic polycarbonate resin (A) described above and at least one type of polyester resin (B) described above, and the aromatic polycarbonate composite resin composition of the present invention includes as the resin component. The resin component contains 60 to 90 parts by mass of the aromatic polycarbonate resin (A) and 10 to 40 parts by mass of the polyester resin (B) so that the total is 100 parts by mass.

When the content of the aromatic polycarbonate resin (A) is not more than the above upper limit, and the content of the polyester resin (B) is not less than the above lower limit, the chemical resistance obtained by blending the polyester resin (B) is improved sufficiently when the content of the aromatic polycarbonate resin (A) is not less than the above lower limit, and the content of the polyester resin (B) is not more than the above upper limit, excellent characteristics including impact resistance and thermal stability are obtained without degrading the inherent characteristics of the aromatic polycarbonate resin (A).

The resin component contains preferably 65 to 85 parts by mass of the aromatic polycarbonate resin (A) and 15 to 35 parts by mass of the polyester resin (B) (the total of the aromatic polycarbonate resin (A) and the polyester resin (B) is 100 parts by mass).

[Graft Copolymer (C)]

The graft copolymer (C) used in the present invention is a graft copolymer obtained by graft polymerization of a (meth)acrylic acid ester compound with a diene rubber and has (i) a sulfur content of 100 to 1,500 ppm and (ii) an average particle diameter of 70 to 240 nm.

According to the present invention, since the specific graft copolymer (C) as described above is blended with the resin composition formed of the aromatic polycarbonate resin (A) and the polyester resin (B) at a predetermined rate, the impact resistance especially the low-temperature impact resistance is improved.

A diene rubber in the graft copolymer (C) may be a butadiene-based rubber such as a copolymer between butadiene and at least one type of vinyl monomer copolymerizable therewith (hereinafter, the vinyl monomer copolymerizable with butadiene is referred to as the "copolymerizable vinyl monomer"), which includes a polybutadiene, (partially) hydrogenated polybutadiene, a butadiene-styrene copolymer, a (partially) hydrogenated polybutadiene-styrene copolymer, a butadiene-styrene block copolymer, a (partially) hydrogenated polybutadiene-styrene block copolymer, a butadiene-acrylonitrile copolymer, or an acrylic rubber-based copolymer containing butadiene-isobutylacrylate as a primary component; or an isobutylene-based rubber such as a polyisobutylene, a polyisobutylene-styrene copolymer, or a polyisobutylene-styrene block copolymer. Among those mentioned above, the butadiene-based rubber is preferable.

The butadiene-based rubber described above is preferably obtained by polymerization or copolymerization between 75 to 100 percent by mass of 1,3-butadiene and 0 to 25 percent by mass of the copolymerizable vinyl monomer. The butadiene-based rubber is more preferably polybutadiene, a butadiene-styrene copolymer, or a butadiene-styrene block copolymer. The styrene content is preferably small, since the impact resistance of the aromatic polycarbonate composite resin composition tends to be degraded, when the styrene content of this copolymer is high.

The butadiene-based rubber used is more preferably a polybutadiene obtained by copolymerization between 1,3-butadiene in an amount of 80 to 100 percent by mass and preferably 95 to 100 percent by mass and the copolymerizable vinyl monomer such as styrene, in an amount of 0 to 20 percent by mass or preferably 0 to 5 percent by mass or a copolymer of butadiene and the copolymerizable vinyl monomer such as a butadiene-styrene copolymer or a butadiene-styrene block copolymer. The butadiene-based rubber is further more preferably polybutadiene substantially formed from 100 percent by mass of 1,3-butadiene. The polybutadiene substantially formed from 100 percent by mass of 1,3-butadiene represents a rubber formed only from butadiene, but it may contain a very small amount of another component for improving the thermal stability of the graft copolymer (C) and to easily control the particle diameter. A content of the another component in the butadiene-based rubber is usually 5 percent by mass or less, preferably 3 percent by mass or less, and more preferably 1 percent by mass or less.

The graft copolymer (C) may contain one type of diene-based rubber or at least two types of diene-based rubbers.

The (meth)acrylic acid ester compound to be copolymerized with the diene rubber, that is, the acrylic acid ester compound or the methacrylic acid ester compound may be a methacrylic alkyl ester such as methyl methacrylate, ethyl methacrylate, or n-butyl acrylate; an aryl methacrylate such as phenyl methacrylate or naphthyl methacrylate; or a glycidyl group-containing methacrylate such as glycidyl acrylate or glycidyl methacrylate. Among those mentioned above, the methacrylic alkyl ester is preferable, and methyl methacrylate is most preferable.

One type of (meth)acrylic acid ester compound may be used alone, or at least two types thereof may be used in combination.

The graft copolymer (C) may include another vinyl-based monomer in addition to the above (meth)acrylic acid ester compound. The another vinyl-based monomer may be graft-copolymerized with the diene rubber described above, or the vinyl-based monomers may be polymerized with each other. The existence form of the another vinyl-based monomer in the graft copolymer (C) is not particularly limited. The another vinyl-based monomer may be an aromatic vinyl monomer such as styrene or α-styrene; an unsaturated nitrile such as acrylonitrile or methacrylonitrile; a vinyl ether such as methyl vinyl ether or butyl vinyl ether; a maleimide compound such as maleimide, N-methyl maleimide, or N-phenyl maleimide; or an α,β-unsaturated carboxylic acid compound such as maleic acid, phthalic acid, itaconic acid, or an anhydride thereof (such as maleic anhydride).

In the graft copolymer (C), there may also be used a cross-linkable monomer including an aromatic polyfunctional vinyl compound, such as divinyl benzene or divinyl toluene; a polyalcohol, such as ethylene glycol dimethacrylate or 1,3-butandiol diacrylate; a carboxylic acid ally ester, such as a trimethacrylic acid ester, a triacrylic acid ester, allyl acrylate, or ally methacrylate; or a di- or tri-ally compound, such as diallyl phthalate, diallyl sebacate, or trially triazine.

However, as described later, the graft copolymer (C) is preferably formed of a diene-based rubber and a (meth) acrylic acid ester compound without using the another vinyl-based monomer and the cross-linkable monomer described above.

The graft copolymer (C) contains the dien-based rubber usually in an amount of 50 to 95 percent by mass, preferably 70 to 90 percent by mass, and more preferably 75 to 85 percent by mass in 100 percent by mass of the total of the dien-based rubber, the (meth)acrylic acid ester compound, the another monomer, and the cross-linkable monomer, the latter two of which are used if necessary.

When the content of the diene-based rubber is less than the above lower limit, the impact resistance of the aromatic polycarbonate composite resin composition of the present invention may be degraded in some cases. When the content of the diene-based rubber is more than the above upper limit, the impact resistance may also be degraded in some cases.

The (meth)acrylic acid ester compound to be graft-copolymerized with the diene-based rubber is contained usually in an amount of 50 to 100 percent by mass, preferably 75 to 100 percent by mass, more preferably 90 to 100 percent by mass, and yet more preferably substantially 100 percent by mass in 100 percent by mass of the total of the (meth)acrylic acid ester compound, the another monomer, and the cross-linkable monomer.

When the content of the (meth)acrylic acid ester compound is less than the above lower limit, the impact resistance of the aromatic polycarbonate composite resin composition of the present invention may be degraded in some cases.

The graft copolymer (C) is preferably a core/shell type graft copolymer type in which the diene-based rubber forms a core, and the (meth)acrylic acid ester compound forms a shell, thereby the impact resistance and the surface appearance of a molded article is improved.

A method for manufacturing the graft copolymer (C) is not particularly limited, and any one of bulk polymerization, solution polymerization, suspension polymerization, emulsion polymerization, and the like may be employed. A copolymerization method may be either one-step grafting or multistep grafting. However, an emulsion polymerization method is preferable and a multistep emulsion polymerization method is more preferable, since the productivity and the particle diameter are easily controlled. The multistep emulsion polymerization method includes a polymerization method disclosed in Japanese Patent Publication 2003-261629 A.

The graft copolymer (C) contains sulfur usually in an amount of 100 to 1,500 ppm. When the sulfur content is less than the above lower limit, the heat resistance of the graft copolymer (C) tends to be degraded, and hence, the heat resistance of the aromatic polycarbonate composite resin composition of the present invention in which this graft copolymer (C) is blended may also be degraded in some cases. When the sulfur content is more than the above upper limit, a targeted effect of improving the impact resistance cannot be obtained, and in addition, the hue, discoloration resistance, and moisture heat stability tend to be degraded. From the points as described above, the above sulfur content is more preferably 200 to 1,000 ppm, even more preferably 300 to 800 ppm, and most preferably 400 to 700 ppm.

The sulfur contained in the graft copolymer (C) is originated from sulfur contained in an emulsifier, a dispersant, a polymerization initiator, a thermal stabilizer, and the like used in graft copolymer manufacturing and in a powder formation step. The sulfur is in the form of an inorganic sulfuric acid salt, an organic sulfonic acid salt, a mercaptan compound, and/or a thioether compound.

The graft copolymer (C) having a sulfur content within the above range is obtained by removing the above sulfur-containing components during post-treatment steps including a cleaning step or a powder formation step, after the graft copolymer is manufactured.

The sulfur content described above may be measured by a combustion ion chromatography method. In the chromatography method, combustion is performed using AQF-100 manufactured by Mitsubishi Chemical Analytec Co., Ltd. under conditions in which the temperature is 900° C. to 1,000° C., the flow rate of a purge gas is 600 ml/min, a combustion time is 8 minutes, and the volume of an absorption liquid containing hydrogen peroxide water at a concentration of 0.09% is 25 ml. The amount of sulfuric acid ions ($SO_4^{2-}$) is measured using an ICS-90 type ion chromatography apparatus manufactured by Dionex Corp. under the conditions in which the column is IonPac AS12A, an eluting solution is 2.7 mM of $Na_2CO_3$+0.3 mM of $NaHCO_3$, a regeneration solution is 15 ml of $H_2SO_4$, a flow rate is 1.3 ml/min, and an analytical time is 20 minutes. The amount of sulfur (S) is calculated from the amount of the sulfuric acid ions thus measured.

The graft copolymer (C) has an average particle diameter of 70 to 240 nm. When the average particle diameter is less than the above lower limit, it is not preferable since the impact resistance of the aromatic polycarbonate composite resin composition of the present invention becomes insufficient. In addition, when the average particle diameter is more than the above upper limit, it is not preferable since the impact resistance of the aromatic polycarbonate composite resin composition of the present invention is also decreased in high temperature molding, and furthermore, the initial hue is also degraded. From the points as described above, the average particle diameter of the graft copolymer (C) is more preferably 80 to 220 nm, even more preferably 90 to 190 nm, particularly preferably 100 to 170 nm, and most preferably 120 to 160 nm.

The average particle diameter of the graft copolymer (C) is obtained from a volume average particle diameter D50 measured by a dynamic light scattering method which is performed on a graft copolymer solution after the polymerization is completed. For this measurement, "Microtrac particle size analyzer 9230UPA" manufactured by Nikkiso Co., Ltd. may be used.

The aromatic polycarbonate composite resin composition of the present invention contains the graft copolymer (C) usually 3 parts by mass or more, preferably 4 parts by mass or more, and more preferably 5 parts by mass or more with respect to 100 parts by mass of the resin component formed of the aromatic polycarbonate resin (A) and the polyester resin (B). In addition, the content of the graft copolymer (C) is usually 20 parts by mass or less, preferably 17 parts by mass or less, and more preferably 15 parts by mass or less with respect to 100 parts by mass of the resin component. When the content of the graft copolymer (C) is less than the above lower limit, the impact resistance of the aromatic polycarbonate composite resin composition of the present invention may become insufficient in some cases. When the content described above is more than the above upper limit, the impact resistance and the hue may be degraded unpreferably in some cases.

[Stabilizer (D)]

The aromatic polycarbonate composite resin composition of the present invention further contains an organic phosphate compound represented by the following general formula (I) as the stabilizer (D) for suppressing hydrolysis of the polyester resin (B).

$$O=P(OH)_m(OR)_{3-m} \quad (I)$$

In the general formula (I), R represents an alkyl group or an aryl group, and Rs may be the same or different from each other. m represents an integer of 0 to 2.

In the above general formula (I), R preferably represents an alkyl group having 1 to 30 carbon atoms or an aryl group having 6 to 30 carbon atoms and more preferably an alkyl group having 2 to 25 carbon atoms. In addition, m preferably represents 1 or 2.

The above organic phosphate compounds as the stabilizer (D) may be used alone, or at least two types thereof may be used by mixing.

The aromatic polycarbonate composite resin composition of the present invention contains the stabilizer (D) as described above in an amount of 0.005 to 0.1 parts by mass and preferably 0.01 to 0.07 parts by mass with respect to 100 parts by mass of the resin component formed of the aromatic polycarbonate resin (A) and the polyester resin (B). When the content of the stabilizer (D) is less than the above lower limit or more than the above upper limit, the heat resistance especially the residence heat resistance of the aromatic polycarbonate composite resin composition is degraded unpreferably.

[Silicate Salt Compound (E)]

The aromatic polycarbonate composite resin composition of the present invention preferably further contains a silicate salt compound (E), such as talc, mica, kaolinite, sepiolite, attapulgite, montmorillonite, bentonite, and/or smectite, whereby the crystallization of the polyester resin (B) is promoted, a molding cycle is shortened, and the productivity is improved. The silicate salt compound (E) may be used alone, or at least two types thereof may be used by mixing.

The silicate salt compound (E) is preferably talc, and the average particle diameter thereof is preferably 0.1 to 30 μm, more preferably 1 to 20 μm, and particularly preferably 2 to 10 μm. The average particle diameter indicates $D_{50}$ measured by a laser diffraction type particle size distribution measuring apparatus and can be measured using "laser diffraction type particle size distribution measuring apparatus SALD-2100" manufactured by Shimadzu Corporation.

The aromatic polycarbonate composite resin composition of the present invention preferably contains the silicate salt compound (E) such as talc in an amount of 0.01 to 0.5 parts by mass and particularly preferably 0.05 to 0.2 parts by mass with respect to 100 parts by mass of the resin component formed of the aromatic polycarbonate resin (A) and the polyester resin (B). When the content of the silicate salt compound (E) is less than the above lower limit, the above effect obtained by blending of the silicate salt compound (E) may not be sufficiently obtained, and when the content thereof is more than the above upper limit, the impact resistance tends to be degraded.

[Other Components]

Besides the aromatic polycarbonate resin (A), the polyester resin (B), the graft copolymer (C), the stabilizer (D), and the silicate salt compound (E), the aromatic polycarbonate composite resin composition of the present invention may also contain various other types of additives which are contained in general polycarbonate resin compositions, if necessary.

As the various types of additives which can be contained in the aromatic polycarbonate composite resin composition of the present invention, for example, there may be mentioned an antioxidant, a mold releasing agent, a UV absorber, a dye and pigment, a reinforcing agent, a flame retardant, an anti-dripping agent, an impact-resistance improver, an antistatic agent, an antifogging agent, a lubricant, an anti-blocking agent, a flow improver, a plasticizer, a dispersant, and an antibacterial agent.

Hereinafter, examples of the additives suitable for the aromatic polycarbonate composite resin composition of the present invention will be described in detail.

<Mold Releasing Agent>

The mold releasing agent may be at least one type of compound selected from the group consisting of an aliphatic carboxylic acid, an ester formed of an aliphatic carboxylic acid and an alcohol, an aliphatic hydrocarbon compound having a number average molecular weight of 200 to 15,000, and a polysiloxane-based silicone oil.

The aliphatic carboxylic acid may be a monovalent, a divalent, or a trivalent saturated or unsaturated carboxylic acid. In this case, the aliphatic carboxylic acid includes an alicyclic carboxylic acid. Among those mentioned above, a monovalent or a divalent carboxylic acid having 6 to 36 carbon atoms is a preferable carboxylic acid, and a saturated monovalent aliphatic carboxylic acid having 6 to 36 carbon atoms is more preferable. Particular examples of the aliphatic carboxylic acid as described above include palmitic acid, stearic acid, caproic acid, capric acid, lauric acid, arachic acid, behenic acid, lignoceric acid, cerotic acid, melissic acid, tetratriacontanoic acid, montanoic acid, adipic acid, and azelaic acid.

The aliphatic carboxylic acid for forming the ester with an alcohol may be the same acid as the aliphatic carboxylic acid mentioned above. The alcohol may be a monovalent or a polyvalent saturated or unsaturated alcohol. The alcohol may have a substituent such as a fluorine atom or an aryl group. Among those mentioned above, a monovalent or a polyvalent saturated alcohol having 30 carbon atoms or less is preferable, and a monovalent or a polyvalent saturated aliphatic alcohol having 30 carbon atoms or less is more preferable. In this case, the aliphatic compound includes an alicyclic compound. As particular examples of the alcohols mentioned above, for example, there may be mentioned octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, and dipentaerythritol.

The ester compound described above may contain an aliphatic carboxylic acid and/or an alcohol as an impurity and may be a mixture of a plurality of compounds.

Particular examples of the ester formed of an aliphatic carboxylic acid and an alcohol include a bees wax (mixture containing myricyl palmitate as a primary component), stearyl stearate, behenyl behenate, stearyl behenate, glycerin monopalmitate, glycerin monostearate, glyceryl distearate, glyceryl tristearate, pentaerythritol monopalmitate, pentaerythritol monostearate, pentaerythritol distearate, pentaerythritol tristearate, and pentaerythritol tetrastearate.

The aliphatic hydrocarbon having a number average molecular weight of 200 to 15,000 may be a liquid paraffin, a paraffin wax, a microcrystalline wax, a polyethylene wax, a Fischer-Tropsch wax, and an α-olefinic oligomer having 3 to 12 carbon atoms. In this case, as the aliphatic hydrocarbon, an alicyclic hydrocarbon is also included. The hydrocarbon compound may be partially oxidized. Among those mentioned above, a paraffin wax, a polyethylene wax, or a partially oxidized polyethylene wax is preferable, a paraffin wax and a polyethylene wax are more preferable, and the number average molecular weight is preferably 200 to 5,000. Those aliphatic hydrocarbons each may be formed from a single material or a mixture containing various constituent components having different molecular weights as long as the primary component is in the range described above.

The polysiloxane-based silicone oil may be a dimethyl silicone oil, a phenyl methyl silicone oil, a diphenyl silicone oil, and a fluorinated alkyl silicone oil. At least two types of those mentioned above may also be used in combination.

When the mold releasing agent is used, the content thereof in the aromatic polycarbonate composite resin composition of the present invention is usually 0.05 to 2 parts by mass and preferably 0.1 to 1 part by mass with respect to 100 parts by mass of the resin component formed of the aromatic polycarbonate resin (A) and the polyester resin (B). When the content of the mold releasing agent is not less than the above lower limit, an effect of improving mold releasing properties can be sufficiently obtained, and when the content is not more than the above upper limit, problems such as degradation in hydrolysis resistance and mold contamination in injection molding, each of which is caused by an excessive addition amount of the mold releasing agent, can be prevented.

<UV Absorber>

Examples of the UV absorber include inorganic UV absorbers such as cerium oxide and zinc oxide, and organic UV absorbers such as a benzotriazole compound, a benzophenone compound, and a triazine compound. Among those mentioned above, the organic UV absorbers are preferable. In particular, at least one type selected from the group consisting of a benzotriazole compound, 2-(4,6-diphenyl-1,3,5-triazine-2-yl)-5-[(hexyl)oxy]-phenol, 2-[4,6-bis(2,4-dimethylphenyl)-1,3,5-triazine-2-yl]-5-(octyloxy)phenol, 2,2'-(1,4-phenylene)bis[4H-3,1-benzoxazine-4-one], and [(4-methoxyphenyl)-methylene]-propanedioic acid-dimethyl ester is preferable.

A particular example of the benzotriazole compound is a condensed product with methyl-3-[3-tert-butyl-5-(2H-benzotriazole-2-yl)-4-hydroxyphenyl]propionate-polyethylene glycol. Other particular examples of the benzotriazole compounds include 2-bis(5-methyl-2-hydroxyphenyl)benzotriazole, 2-(3,5-di-tert-butyl-2-hydroxyphenyl)benzotriazole, 2-(3',5'-di-tert-butyl-2'-hydroxyphenyl)-5-chlorobenzotriazole, 2-(3-tert-butyl-5-methyl-2-hydroxyphenyl)-5-chlorobenzotriazole, 2-(2'-hydroxy-5'-tert-octylphenyl)benzotriazole, 2-(3,5-di-tert-amyl-2-hydroxyphenyl)benzotriazole, 2-[2-hydroxy-3,5-bis(α, α-dimethylbenzyl)phenyl]-2H-benzotriazole, and a condensed product of 2,2'-methylene-bis[4-(1,1,3,3-tetramethylbutyl)-6-(2N-benzotriazole-2-yl)phenol] and [methyl-3-[3-tert-butyl-5-(2H-benzotriazole-2-yl)-4-hydroxyphenyl]propionate-polyethylene glycol]. At least two types of those compounds mentioned above may also be used in combination.

Among those compounds mentioned above, 2-(2'-hydroxy-5'-tert-octylphenyl)benzotriazole, 2-[2-hydroxy-3,5-bis(α,α-dimethylbenzyl)phenyl]-2H-benzotriazole, 2-(4,6-diphenyl-1,3,5-triazine-2-yl)-5-[(hexyl)oxy]-phenol, 2-[4,6-bis(2,4-dimethylphenyl)-1,3,5-triazine-2-yl)-5-(octyloxy) phenol, and 2,2'-methylene-bis[4-(1,1,3,3-tetramethylbutyl)-6-(2N-benzotriazole-2-yl)phenol] are preferable.

When the UV absorber is used, the content thereof in the aromatic polycarbonate composite resin composition of the present invention is usually 0.05 to 2 parts by mass and preferably 0.1 to 1 part by mass with respect to 100 parts by mass of the resin component formed of the aromatic polycarbonate resin (A) and the polyester resin (B). When the content of the UV absorber is not less than the above lower limit, an effect of improving weather resistance can be sufficiently obtained, and when the content described above is not more than the above upper limit, problems such as mold deposits can be reliably prevented.

<Dye and Pigment>

The dye and pigment may be an inorganic pigment, an organic pigment, or an organic dye. The inorganic pigment may be a sulfide-based pigment such as carbon black, cadmium red, or cadmium yellow; a silicate salt-based pigment such as ultramarine blue; an oxide-based pigment such as zinc white, red iron oxide, chromium oxide, titanium oxide, iron black, titanium yellow, zinc/iron-based brown, titanium/cobalt-based green, cobalt green, cobalt blue, copper/chromium-based black, or copper/iron-based black; a chromate-based pigment such as chrome yellow or molybdate orange; and a ferrocyanide-based pigment such as Prussian blue. The organic pigment and the organic dye may be a phthalocyanine-based dye and pigment such as copper phthalocyanine blue or copper phthalocyanine green; an azo-based dye and pigment such as nickel azo yellow; a condensed polycyclic dye and pigment such as thioindigo-based compound, a perynone-based compound, a perylene-based compound, a quinacridone-based compound, a dioxazine-based compound, an isoindolinone-based compound, or a quinophthalone-based compound; or an anthraquinone-based, a heterocyclic-based, or a methyl-based dye and pigment. At least two types of those compounds may be used in combination. Among those compounds, carbon black, titanium oxide, a cyanine-based compound, a quinoline-based compound, an anthraquinone-based compound, and a phthalocyanine-based compound are preferable in view of thermal stability.

When the dye and pigment is used, the content thereof in the aromatic polycarbonate composite resin composition of the present invention is usually 5 parts by mass or less, preferably 3 parts by mass or less, and more preferably 2 parts by mass or less with respect to 100 parts by mass of the resin component formed of the aromatic polycarbonate resin (A) and the polyester resin (B). When the content of the dye and pigment is more than 5 parts by mass, the impact resistance may be insufficient in some cases.

<Flame Retardant>

The flame retardant may be a halogenated flame retardant such as a polycarbonate of a halogenated bisphenol A, a brominated bisphenol based epoxy resin, a brominated bisphenol based phenoxy resin, or a brominated polystyrene; a phosphate ester-based flame retardant; an organic metal salt-based flame retardant, such as diphenylsulfone-3,3'-disulfonic acid dipotassium, diphenylsulfone-3-sulfonic acid potassium, or perfluorobutane sulfonic acid potassium; or a polyorganosiloxane-based flame retardant. Among those mentioned above, a phosphate ester-based flame retardant is particularly preferable.

Particular examples of the phosphate ester-based flame retardant include triphenyl phosphate, resorcinol bis(dixylenylphosphate), hydroquinone bis(dixylenylphosphate), 4,4'-biphenol bis(dixylenylphosphate), bisphenol A bis(dixylenylphosphate), resorcinol bis(diphenylphosphate), hydroquinone bis(diphenylphosphate), 4,4'-biphenol bis(diphenylphosphate), and bisphenol A bis(diphenylphosphate). At least two types of those flame retardants may also be used in combination. Among those flame retardants, resorcinol bis(dixylenylphosphate) and bisphenol A bis(diphenylphosphate) are preferable.

The flame retardants may be used alone, or at least two types thereof may be used by mixing.

When the flame retardant is used, the content thereof in the aromatic polycarbonate composite resin composition of the present invention is usually 0.05 to 30 parts by mass, preferably 0.1 to 20 parts by mass, and more preferably 0.3 to 15 parts by mass with respect to 100 parts by mass of the resin component formed of the aromatic polycarbonate resin (A) and the polyester resin (B). When the content of the flame retardant is not less the above lower limit, sufficient flame retardancy can be obtained, and when the content is not more than the above upper limit, degradation in heat resistance caused by an excessive addition amount of the flame retardant can be reliably prevented.

<Anti-Dripping Agent>

The anti-dripping agent may be a fluorinated polyolefin such as a polyfluoroethylene and in particular, a polytetrafluoroethylene having fibril-forming ability is preferable. This compound is easily dispersed in a polymer and has a tendency to form a fibrous material by bonding polymers to each other. A polytetrafluoroethylene having fibril-forming ability is classified in the type 3 of ASTM Standards. A polytetrafluoroethylene in the form of an aqueous dispersion may also be used besides that in a solid form. The polytetrafluoroethylene having fibril-forming ability may be "Teflon (registered trade mark) 6J" or "Teflon (registered trade mark) 30J" sold by Du Pont-Mitsui Fluorochemicals Co., Ltd. or "Polyflon (trade name)" sold by Daikin Industries, Ltd. The anti-dripping agents may be used alone, or at least two types thereof may be used by mixing.

When the anti-dripping agent is used, the content thereof in the aromatic polycarbonate composite resin composition of the present invention is usually 0.1 to 2 parts by mass and preferably 0.2 to 1 part by mass with respect to 100 parts by mass of the resin component formed of the aromatic polycarbonate resin (A) and the polyester resin (B). When the addition amount of the anti-dripping agent is excessive, the appearance of a molded article may be degraded in some cases.

<Other Resins>

In the aromatic polycarbonate composite resin composition of the present invention, other resin component or rubber component may also be contained besides the aromatic polycarbonate resin (A), the polyester resin (B), and the graft copolymer (C). The other resin component or rubber component may be a styrene-based resin such as an acrylonitrile-styrene copolymer, an acrylonitrile-butadiene-styrene copolymer, or a polystyrene resin; a polyolefin resin such as a polyethylene resin or a polypropylene resin; a polyamide resin; a polyimide resin; a poly(ether imide) resin; a polyurethane resin; a poly(phenylene ether) resin; a poly(phenylene sulfide) resin; a polysulfone resin; a polymethacrylate resin; a phenolic resin; or an epoxy resin. The content of the other resins and rubber components is preferably 30 parts by mass or less with respect to 100 parts by mass of the resin component formed of the aromatic polycarbonate resin (A) and the polyester resin (B) in order to sufficiently secure the effect obtained by the use thereof with the aromatic polycarbonate resin (A) and the polyester resin (B).

[Method for Manufacturing Aromatic Polycarbonate Composite Resin Composition]

The aromatic polycarbonate composite resin composition of the present invention can be manufactured using the aromatic polycarbonate resin (A), the polyester resin (B), the graft copolymer (C), and the stabilizer (D) together with the silicate salt compound (E) and the other additives, which are used if necessary, by appropriately selecting one of known arbitrary methods.

One non-limitative example of the methods, the aromatic polycarbonate resin (A), the polyester resin (B), the graft copolymer (C), and the stabilizer (D) are mixed with the silicate salt compound (E) and the other optional additives by a mixing machine such as a tumbler or a Henschel mixer to prepare a mixture. The resin composition can be manufactured by melting and kneading the mixture using a Banbury mixer, rollers, a Brabender, a single screw kneading extruder, a twin screw kneading extruder, a kneader, or the like. The resin composition can also be manufactured by a method where each components described above are supplied using a feeder to an extruder without being mixed together in advance or after a part of them are mixed together in advance, and then melt kneading is performed.

[MVR]

The MVR (melt volume rate) of the aromatic polycarbonate composite resin composition of the present invention is 10 to 40 cm$^3$/10 minutes and particularly preferably 15 to 35 cm$^3$/10 minutes. The MVR is measured by a method described in later the examples.

When the MVR of the aromatic polycarbonate composite resin composition of the present invention is not more than the above upper limit, the impact resistance and the heat resistance are improved. When the MVR is not less than the above lower limit, the fluidity is improved, the residual strain is suppressed, and a molded article having an excellent chemical resistance can be obtained.

Hence, when the aromatic polycarbonate composite resin composition of the present invention is manufactured, the mixing rate among the individual components described above is preferably appropriately adjusted so as to obtain a proper MVR within the blending range of each component.

[Molded Article of Aromatic Polycarbonate Composite Resin Composition]

A method for manufacturing the molded article of the present invention using the aromatic polycarbonate composite resin composition of the present invention is not particularly limited, and a molding method which is generally used for thermoplastic resins may be employed. The method includes a general injection molding method, an ultra high-speed injection molding method, an injection compression molding method, a multicolor injection molding method, a gas-assist injection molding method, a molding method using a heat-insulating mold, a molding method using a rapid heating and cooling mold, foam molding (including a supercritical fluid), insert molding, an IMC (in-mold coating molding) method, an extrusion molding method, a sheet molding method, a thermal molding method, a rotational molding method, a lamination molding method, or a press molding method. In addition, each injection molding method may use a hot runner system.

The aromatic polycarbonate composite resin composition of the present invention may be used in combination with another thermoplastic resin composition for multicolor composite molding to form a composite molded article.

Since having excellent fluidity, the aromatic polycarbonate composite resin composition of the present invention can be suitably used to form a hollow molded article by injection molding, in particular, by gas-assist injection molding.

EXAMPLES

Hereinafter, the present invention will be described in more detail with reference to Examples, but the present invention is not limited thereto as long as without departing from the scope of the present invention.

Raw material components used in the following Examples and Comparative Examples are as follows.

<Aromatic Polycarbonate Resin (A)>

Aromatic polycarbonate resin (PC): "Iupilon (registered trade mark) S-2000" manufactured by Mitsubishi Engineering-Plastics Corp., a bisphenol A type aromatic polycarbonate manufactured by an interfacial polymerization method, having a viscosity average molecular weight of 23,000, and a terminal hydroxyl group concentration of 150 ppm.

<Polyester Resin (B)>

Poly(butylene terephthalate) (PBT): "Novaduran (registered trade mark) 5008" manufactured by Mitsubishi Engineering-Plastics Corp., having an intrinsic viscosity of 0.85 dl/g, and a terminal carboxyl group concentration of 12 eq/Ton.

Poly(ethylene terephthalate) (PET): "Novapex GG501H" manufactured by Mitsubishi Engineering-Plastics Corp., having an intrinsic viscosity of 0.75 dl/g.

<Graft Copolymer (C)>

Butadiene-based elastomer 1: a core/shell type graft copolymer in which the core is formed of a polybutadiene rubber substantially formed from 100 percent by mass of 1,3-butadiene and the shell is formed from methyl methacrylate, and which has a sulfur content of 620 ppm and an average particle diameter of 135 nm.

<Elastomer other than Graft Copolymer (C)>

Butadiene-based elastomer 2: a core/shell type graft copolymer in which the core is formed of a polybutadiene rubber substantially formed from 100 percent by mass of 1,3-butadiene and the shell is formed from methyl methacrylate, and which has a sulfur content of 1,790 ppm and an average particle diameter of 200 nm.

SEBS: "Septon 8006" manufactured by Kuraray Plastics Co., Ltd., hydrogenated styrene-butadiene block copolymer.

Modified ethylene-based elastomer: "Elvaloy AS" manufactured by Du Pont-Mitsui Fluorochemicals Co., Ltd., an ethylene-n-butyl acrylate-glycidine methacrylate terpolymer.

Acrylic-based elastomer: "Staphyloid MG1011" manufactured by Ganz Chemical Co., Ltd., a core/shell type copolymer formed of an acrylic acid alkyl polymer (core)/an acrylonitrile-styrene copolymer (shell).

<Stabilizer (D)>

Organic Phosphate Compound: "AX71" manufactured by Adeka Corp., a mixture of compounds represented by the general formula (I) in which R represents $C_{18}H_{37}$, and m represents 1 to 3.

<Silicate Salt Compound (E)>

Talc: "Micron White #5000S" manufactured by Hayashi-Kasei Co., Ltd., having an average particle diameter of 5 μm.

<Mold Releasing Agent>

Mold releasing agent 1: "VPG861" manufactured by Cognis Japan, pentaerythritol tetrastearate.

Mold releasing agent 2: "Unistar M9676" manufactured by NOF Corp., stearyl stearate.

Evaluation methods of properties and characteristics are as described below.

<Impact Resistance>

After pellets of the resin composition were dried at 80° C. for 5 hours, ISO multipurpose test pieces (3 mm) were formed by injection molding at a cylinder temperature of 280° C. and a mold temperature of 80° C. using SG75MII manufactured by Sumitomo Heavy Industries, Ltd. having a mold clamping force of 75 T.

By the use of the ISO multipurpose test piece (3 mm), a V notch having an R of 0.25 was formed therein in accordance with ISO179, and a Charpy impact resistance strength (unit: $kJ/m^2$) with notch was measured at a temperature of 23° C. This value was regarded as an evaluation value of an ordinary-temperature impact resistance. A Charpy impact resistance strength with notch was measured by the same way as described above except that it was measured at a temperature of −30° C., and this value was regarded as an evaluation value of a low-temperature impact resistance.

<Heat Resistance>

ISO multipurpose test pieces (4 mm) were formed by injection molding at a molding cycle of 1 minute by the same way as the above ISO multipurpose test piece for the impact resistance evaluation. The ISO multipurpose test piece were measured at a load deflection temperature at a load of 1.80 MPa thereof in accordance with ISO75-1 and ISO75-2. This value was regarded as an evaluation value of an ordinary heat resistance.

ISO multipurpose test piece (4 mm) was formed by injection molding at a molding cycle of 10 minutes, when the ISO multipurpose test piece was formed. A load deflection temperature of the test pies was measured by the same way as described above. This value was regarded as an evaluation value of the residence heat resistance.

<MVR (Melt Volume Rate)>

Pellets of the resin composition were dried at 120° C. for 4 hours or more. MVR of each pellet was measured at a measurement temperature of 300° C. and a measurement load of 1.2 kgf (11.8 N) in accordance with ISO1133.

<Cooling Time>

Pellets of the resin composition were dried at 80° C. for 5 hours. Box-shaped molded articles (50 mm×30 mm×30 mm) were formed from the pellets by injection molding at a cylinder temperature of 280° C. and a mold temperature of 50° C. using SG75MII manufactured by Sumitomo Heavy Industries, Ltd. having a mold clamping force of 75 T. A cooling time was gradually decreased, and when the molded article become difficult to be released from the mold, elapsed time at this moment was regarded as an evaluation value of the cooling time.

As the cooling time is decreased, the molding cycle can be shortened, and hence the productivity is superior.

Examples 1 to 20

Comparative Examples 1 to 12

Components shown in Tables 1 to 4 were uniformly mixed together by a tumbler mixer at the rates shown in Tables 1 to 4. Each mixture thus prepared was fed via a barrel to a twin screw extruder ("TEX30XCT" manufactured by The Japan Steel Works, LTD., L/D=42, number of barrels: 12). Melt kneading was performed in the extruder at a cylinder temperature of 260° C. and a screw rotation number of 200 rpm. The composition thus prepared by the melt kneading was extruded from the extruder and was rapidly cooled in a water bath. Pellets were formed from the resin composition thus prepared by a pelletizer. Evaluations were performed by the use of the pellets of the resin composition thus obtained, results of which are shown in Tables 1 to 4.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Blend (parts by mass) | PC | 78.86 | 78.85 | 77.68 | 77.67 | 68.28 | 68.27 | 67.59 | 66.51 | 66.50 | 68.27 |
| | PBT | 21.14 | 21.15 | 22.32 | 22.33 | 31.72 | 31.73 | 32.41 | 33.49 | 33.50 | |
| | PET | | | | | | | | | | 31.73 |
| | Butadiene-based elastomer1 | 5.29 | 5.29 | 11.16 | 11.17 | 5.29 | 5.29 | 7.56 | 11.16 | 11.17 | 5.29 |
| | Mold releasing agent1 | 0.32 | 0.32 | 0.33 | 0.34 | 0.32 | 0.32 | 0.32 | 0.33 | 0.34 | 0.32 |
| | Mold releasing agent2 | 0.11 | 0.11 | 0.11 | 0.11 | 0.11 | 0.11 | 0.11 | 0.11 | 0.11 | 0.11 |
| | Stabilizer | 0.01 | 0.05 | 0.01 | 0.06 | 0.01 | 0.05 | 0.03 | 0.01 | 0.06 | 0.05 |
| Evaluation result | Ordinary-temperature impact resistance (kJ/m$^2$) | 71 | 78 | 65 | 64 | 70 | 67 | 71 | 69 | 70 | 71 |
| | Low-temperature impact resistance (kJ/m$^2$) | 66 | 62 | 61 | 58 | 65 | 63 | 67 | 65 | 65 | 72 |
| | Ordinary heat resistance (° C.) | 95 | 94 | 91 | 90 | 93 | 92 | 92 | 90 | 89 | 93 |
| | Residence heat resistance (° C.) | 89 | 88 | 86 | 85 | 88 | 83 | 85 | 85 | 85 | 88 |
| | MVR (cm$^3$/10 min) | 16 | 18 | 16 | 17 | 21 | 22 | 21 | 20 | 22 | 27 |
| | Cooling time (Seconds) | 12 | 12 | 13 | 13 | 13 | 14 | 14 | 14 | 14 | 14 |

TABLE 2

| | | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Blend (parts by mass) | PC | 78.83 | 78.82 | 77.65 | 77.64 | 68.25 | 68.24 | 67.56 | 66.48 | 66.46 | 68.24 |
| | PBT | 21.17 | 21.18 | 22.35 | 22.36 | 31.75 | 31.76 | 32.44 | 33.52 | 33.54 | |
| | PET | | | | | | | | | | 31.76 |
| | Butadiene-based elastomer1 | 5.29 | 5.29 | 11.17 | 11.18 | 5.29 | 5.29 | 7.57 | 11.17 | 11.18 | 5.29 |
| | Mold releasing agent1 | 0.32 | 0.32 | 0.34 | 0.34 | 0.32 | 0.32 | 0.32 | 0.34 | 0.34 | 0.32 |
| | Mold releasing agent2 | 0.11 | 0.11 | 0.11 | 0.11 | 0.11 | 0.11 | 0.11 | 0.11 | 0.11 | 0.11 |
| | Stabilizer | 0.01 | 0.05 | 0.01 | 0.06 | 0.01 | 0.05 | 0.03 | 0.01 | 0.06 | 0.05 |
| | Talc | 0.11 | 0.11 | 0.11 | 0.11 | 0.11 | 0.11 | 0.11 | 0.11 | 0.11 | 0.11 |
| Evaluation result | Ordinary-temperature impact resistance (kJ/m$^2$) | 69 | 67 | 63 | 62 | 68 | 67 | 70 | 69 | 69 | 69 |
| | Low-temperature impact resistance (kJ/m$^2$) | 65 | 62 | 60 | 58 | 64 | 63 | 65 | 65 | 64 | 70 |
| | Ordinary heat resistance (° C.) | 95 | 94 | 91 | 90 | 93 | 93 | 92 | 90 | 89 | 94 |
| | Residence heat resistance (° C.) | 89 | 88 | 86 | 85 | 88 | 86 | 85 | 85 | 85 | 88 |

TABLE 2-continued

|  |  | Example 11 | Example 12 | Example 13 | Example 14 | Example 15 | Example 16 | Example 17 | Example 18 | Example 19 | Example 20 |
|---|---|---|---|---|---|---|---|---|---|---|---|
|  | MVR (cm³/10 min) | 15 | 17 | 15 | 16 | 20 | 21 | 20 | 19 | 21 | 25 |
|  | Cooling time (Seconds) | 7 | 7 | 7 | 7 | 8 | 9 | 9 | 9 | 9 | 9 |

TABLE 3

|  |  | Comparative Example1 | Comparative Example2 | Comparative Example3 | Comparative Example4 |
|---|---|---|---|---|---|
| Blend (parts by mass) | PC | 68.27 | 68.27 | 68.27 | 68.27 |
|  | PBT | 31.73 | 31.73 | 31.73 | 31.73 |
|  | Butadiene-based elastomer2 | 5.29 |  |  |  |
|  | SEBS |  | 5.29 |  |  |
|  | Modified ethylene-based elastomer |  |  | 5.29 |  |
|  | Acrylic-based elastomer |  |  |  | 5.29 |
|  | Mold releasing agent1 | 0.32 | 0.32 | 0.32 | 0.32 |
|  | Mold releasing agent2 | 0.11 | 0.11 | 0.11 | 0.11 |
|  | Stabilizer | 0.05 | 0.05 | 0.05 | 0.05 |
| Evaluation result | Ordinary-temperature impact resistance (kJ/m²) | 53 | 75 | 72 | 77 |
|  | Low-temperature impact resistance (kJ/m²) | 45 | 21 | 21 | 16 |
|  | Ordinary heat resistance (° C.) | 92 | 91 | 92 | 92 |
|  | Residence heat resistance (° C.) | 83 | 83 | 81 | 83 |
|  | MVR (cm³/10 min) | 22 | 21 | 21 | 21 |
|  | Cooling time (Seconds) | 13 | 13 | 13 | 13 |

TABLE 4

|  |  | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|
| Blend (parts by mass) | PC | 78.86 | 78.75 | 77.68 | 77.55 | 68.29 | 68.12 | 66.52 | 66.33 |
|  | PBT | 21.14 | 21.25 | 22.32 | 22.45 | 31.71 | 31.88 | 33.48 | 33.67 |
|  | Butadiene-based elastomer1 | 5.29 | 5.31 | 11.16 | 11.22 | 5.29 | 5.31 | 11.16 | 11.22 |
|  | Mold releasing agent1 | 0.32 | 0.32 | 0.33 | 0.34 | 0.32 | 0.32 | 0.33 | 0.34 |
|  | Mold releasing agent2 | 0.11 | 0.11 | 0.11 | 0.11 | 0.11 | 0.11 | 0.11 | 0.11 |
|  | Stabilizer |  | 0.53 |  | 0.56 |  | 0.53 |  | 0.56 |
| Evaluation result | Ordinary-temperature impact resistance (kJ/m²) | 68 | 67 | 69 | 67 | 67 | 68 | 69 | 67 |
|  | Low-temperature impact resistance (kJ/m²) | 64 | 63 | 62 | 62 | 63 | 63 | 63 | 61 |
|  | Ordinary heat resistance (° C.) | 90 | 88 | 87 | 86 | 87 | 85 | 85 | 84 |
|  | Residence heat resistance (° C.) | 82 | 81 | 81 | 79 | 79 | 77 | 75 | 75 |
|  | MVR (cm³/10 min) | 17 | 20 | 17 | 19 | 24 | 27 | 22 | 25 |
|  | Cooling time (Seconds) | 12 | 12 | 13 | 13 | 13 | 13 | 14 | 14 |

[Discussion]

The impact resistance especially the low-temperature impact resistance was degraded in all Comparative Examples 1 to 4 in which the elastomer other than the butadiene-based elastomer 1 corresponding to the graft copolymer (C) of the present invention was used.

The heat resistance was not sufficient, and in particular, the residence heat resistance was degraded in Comparative Examples 5, 7, 9, and 11 where the stabilizer (D) was not used and in Comparative Examples 6, 8, 10, and 12 where the addition amount of the stabilizer (D) was excessive, although the butadiene-based elastomer 1 corresponding to the graft copolymer (C) of the present invention was used therein.

In contrast, the impact resistance, the low-temperature impact resistance, the heat resistance, the residence heat resistance, and the fluidity (moldability) are excellent in all Examples 1 to 20 where the butadiene-based elastomer 1 which is the graft copolymer (C) of the present invention, and the stabilizer (D) are contained at a predetermined rate. In particular, in Examples 11 to 20 in which talc is used, it is found that the productivity is also superior, since the number of cooling seconds is small.

The aromatic polycarbonate composite resin composition of the present invention in which the polyester resin (B) is blended with the aromatic polycarbonate resin (A) at a predetermined rate has an excellent effect of improving the chemical resistance because of the polyester resin (B) and excellent rigidity, dimensional stability, and the like because of the intrinsic characteristics of the aromatic polycarbonate resin (A).

Although the present invention has been described in detail with reference to specific embodiments, it is apparent to a person skilled in the art that various changes and modifications may be performed without departing from the spirit and the scope of the present invention.

The present application is based on Japanese Patent Application filed Apr. 23, 2012 (Japanese Patent Application No. 2012-097805), the entire content of which is incorporated herein by reference.

The invention claimed is:

1. An aromatic polycarbonate composite resin composition comprising;
    100 parts by mass of a resin component which comprises 60 to 90 parts by mass of an aromatic polycarbonate resin (A) and 10 to 40 parts by mass of a polyester resin (B);
    3 to 20 parts by mass of a graft copolymer (C) formed by graft polymerization of a (meth)acrylic acid ester compound with a diene-based rubber; and
    0.005 to 0.1 parts by mass of a stabilizer (D),
    wherein the graft copolymer (C) has
        (i) a sulfur content of 100 to 1,500 ppm, and
        (ii) an average particle diameter of 70 to 240 nm, and
    wherein the stabilizer (D) is an organic phosphate compound represented by formula (I):

$$O=P(OH)_m(OR)_{3-m} \quad (I),$$

where R represents an alkyl group or an aryl group and the R groups may be the same or different from each other, and m represents an integer of 0 to 2.

2. The aromatic polycarbonate composite resin composition according to claim 1, wherein the diene-based rubber comprises 80 percent by mass or more of butadiene.

3. The aromatic polycarbonate composite resin composition according to claim 1, wherein the graft copolymer (C) is a core/shell type graft copolymer in which the diene-based rubber functions as a core and the (meth)acrylic acid ester compound functions as a shell.

4. The aromatic polycarbonate composite resin composition according to claim 1, wherein the resin composition has a melt volume rate of 10 to 40 $cm^3$/10 minutes, the melt volume rate being measured in accordance with ISO1133 at a measurement temperature of 300° C. and at a measurement load of 1.2 kgf (11.8 N) after the resin composition in the form of pellets is dried at 120° C. for 4 hours or more.

5. The aromatic polycarbonate composite resin composition according to claim 1, wherein the resin composition further comprises one or more additives selected from the group consisting of an antioxidant, a mold releasing agent, a UV absorber, a dye and pigment, a reinforcing agent, a flame retardant, an anti-dripping agent, an impact-resistance improver, an antistatic agent, an antifogging agent, a lubricant, an anti-blocking agent, a flow improver, a plasticizer, a dispersant, and an antibacterial agent.

6. The aromatic polycarbonate composite resin composition according to claim 1, wherein the resin composition further comprises 0.01 to 0.5 parts by mass of a silicate salt compound (E) with respect to 100 parts by mass of the resin component.

7. The aromatic polycarbonate composite resin composition according to claim 6, wherein the silicate salt compound (E) is talc.

8. A molded article obtained by molding the aromatic polycarbonate composite resin composition according to claim 1.

9. The molded article according to claim 8, wherein the article is a housing for a portable terminal.

* * * * *